Sept. 28, 1965 R. J. COHEN 3,208,288
DISPLACEMENT PICKOFF FOR GYROSCOPE
Filed Nov. 1, 1962 2 Sheets-Sheet 1

ROBERT J. COHEN
INVENTOR.

BY
ATTORNEYS 3,208,288
DISPLACEMENT PICKOFF FOR GYROSCOPE
Robert J. Cohen, Wyckoff, N.J., assignor to General Precision Inc., Little Falls, N.J., a corporation of Delaware
Filed Nov. 1, 1962, Ser. No. 234,706
5 Claims. (Cl. 74—5.6)

The present invention relates to pickoffs for gyroscopes and more particularly to a pickoff having a stator located outside of the gyro flotation fluid.

In a prior type of gyroscope, the stator and rotor coils of the pickoff were located in the flotation fluid. This resulted in strain sensitivity of the lamination material of the stator and consequent null shift with temperature gradients. In addition, the individual sections of the stator could not be adjusted readily to provide an optimum null position.

In accordance with the present invention, the stators of the pickoff are located outside of the gyro fluid compartment where they are not contaminated by the flotation fluid and can be readily adjusted relative to the rotor coils to provide an optimum null position. By locating the stators outside of the flotation fluid, a better lamination material may be employed, and it does not have to be coated with the plastic potting previously used which put mechanical strain on the laminations. Further, in the event of a stator failure, the individual stator sections can be externally replaced without disassembling the gyro.

Accordingly, it is one object of the invention to provide an improved pickoff for producing an electrical signal proportional to the angular displacement of a gyroscope from some reference position.

It is another object of the invention to provide a gyroscope pickoff having improved reliability and performance as compared with pickoffs previously employed in gyroscopes.

It is a further object of the invention to provide a pickoff having the stators thereof located outside of the gyro flotation fluid so that they can be made of better lamination material and do not have to be coated with plastic potting.

It is a still further object of the invention to provide a pickoff for a gyroscope having stators which can be readily adjusted to obtain an optimum null position and easily replaced in the event of failure without disassembling the gyro.

It is a still further object of the invention to provide a pickoff for a gyroscope which is stable and reliable in operation, simple in construction, and easy to adjust and repair.

Figure 1:
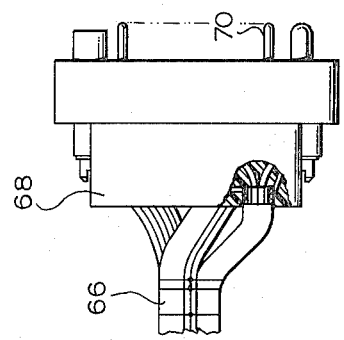
Figure 1:
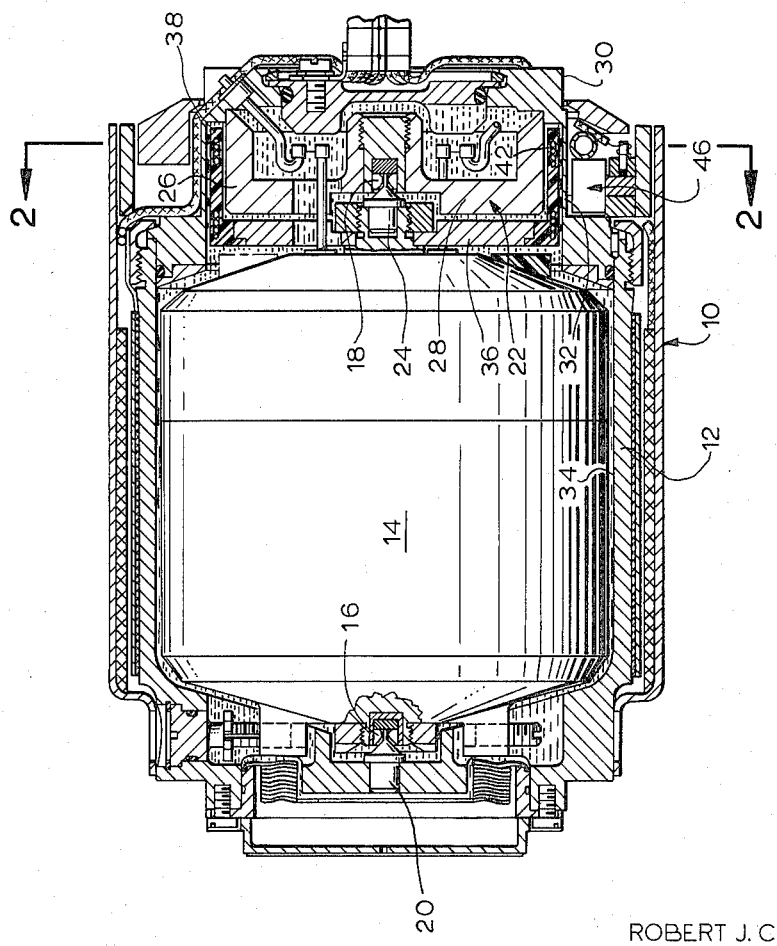
Figure 2:
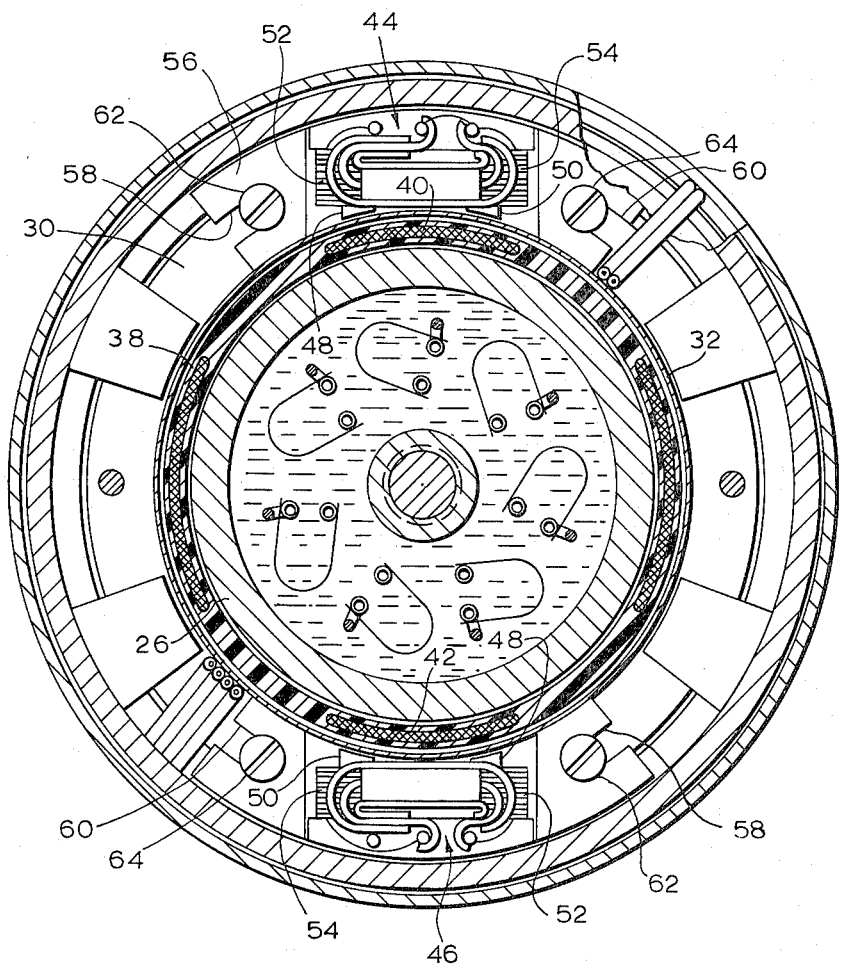

Further objects and advantages of the present invention will be specifically pointed out or will otherwise become apparent when referring, for a better understanding of the invention, to the following description taken in conjunction with the accompanying drawings, wherein:

FIG. 1 is a sectional view of a gyroscope having a displacement pickoff embodying features of the present invention; and FIG. 2 is a sectional view taken along the line 2—2 of FIG. 1.

Referring to FIGS. 1 and 2, a gyroscope 10 embodying features of the invention is illustrated which comprises a cylindrical housing 12 having a spin motor housing or float 14 pivotally mounted therein by jewel bearings 16 and 18. The bearing 16 is mounted on the left end of the spin motor housing and journals a stub shaft 20 fixed on the left end of the housing 12 and the bearing 18 is fixed within a cup-shaped magnetic return path 22 and journals a stub shaft 24 fixed to and projecting from the right end of the spin motor housing 14. The cup-shaped magnetic return path 22 has a cylindrical wall 26 and a circular bottom wall 28 with the cylindrical wall 26 being fixed within an end cover 30 closing off the right end of the housing 12.

The end cover 30 includes a thin cylindrical fluid seal wall 32 and closes off the compartment 34 within the housing which contains the flotation fluid for the gyroscope. A cup-shaped rotor 36 is fixed on the right end of the spin motor housing 14 for rotation therewith and has a cylindrical wall 38 positioned in the space between the fluid seal wall 32 and the cylindrical wall 26 of the magnetic return path. A pair of coils 40 and 42 are embedded in the cylindrical wall 38 of the rotor in position to have the same common axis extending perpendicularly through the output axis of the gyroscope 10. With this construction, the rotor coils will be angularly displaced in response to angular displacement of the spin motor housing 14 about the gyroscope output axis.

Stators 44 and 46 are positioned outside of the fluid seal wall 32 opposite the rotor coils 40 and 42, respectively, to detect any angular displacement of the rotor coils. Each of the stators comprises a laminated core having spaced legs 48 and 50 with coils 52 and 54 wound about each of the legs respectively. The stator coils are connected in phase opposition so that the magnetic flux is additive in each core. Each core is supported on an arcuate base 56 having slots 58 and 60 in the ends thereof to enable it to be adjustably mounted on a radial wall of the end cover 30 by a pair of screws 62 and 64.

The necessary electrical connections to the gyroscope 10 are made by a plurality of wires which project from the end cover 30 and form a cable 66 having a male plug 68 on the end thereof. A plurality of prongs 70 projecting from the plug 68 are electrically connected to different ones of the wires. The stator coils 52 and 54 of each stator 44 and 46 are connected to a source of alternating current by means of the plug 68 so as to produce an alternating magnetic flux in the stator cores which links the rotor coils 40 and 42, the magnetic return path 22 intensifying the magnetic flux linking the rotor coils. With the rotor coils centered between the two stators as illustrated, the magnetic flux from each of the legs of the stators is equal and the output of the rotor coils is zero because the net flux is zero. However, when the rotor coils are angularly displaced in response to angular displacement of the spin motor housing 14, each rotor coil couples one of the stator legs adjacent thereto more than the other so that the rotor coils produce an output proportional to the angular displacement of the spin motor housing 14.

With this construction, each of the stators 44 and 46 can be independently adjusted by the adjusting screws 62 and 64 to enable an optimum null position to be easily obtained. By connecting the two rotor coils together in series, the rotor output coil can be increased, and if desired more than two sets of rotor coils and stators can be utilized to increase the output from the pickoff. It is also apparent that a reduced output could be obtained by using only one stator and rotor coil, rather than the two sets as illustrated. When a plurality of pickoff stators are utilized as illustrated, they may be connected in series or parallel with the parallel arrangement providing a reduced pickoff scale factor with reduced power consumption.

By relocating the stators to the outside of the compartment 34 for the gyro flotation fluid, a strain-insensitive lamination material such as silicon iron (Trancor T) may be employed for the stator cores to reduce mechanical strain sensitivity and the potting material normally employed to protect the lamination material from contamination by the flotation fluid can be eliminated. By alleviating the strain sensitivity problem in this manner, null shifts with temperature gradients are minimized, and if a stator should fail, it can be replaced without disassembling the gyro. Further, the relocation of the stators enables less flotation fluid to be employed which reduces the weight of the gyro and increases its temperature range.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In combination with a floated, single-axis gyroscope including a housing containing a floatation medium, a float mounted in said housing for angular movement about an axis constituting the output axis of the gyroscope, and a gyro spin motor mounted for high-speed rotation within the float, an output signal pickoff comprising:
    fluid seal wall means defining a chamber in one end of said housing;
    pickoff rotor means disposed in said said chamber and secured to the exterior of said float; and
    pickoff stator means disposed externally about said chamber and coactive with the pickoff rotor means therein to generate an output signal in response to angular displacement of the float about said axis.

2. The combination defined in claim 1, wherein said rotor includes a coil having an axis substantially perpendicular to said output axis and said stator includes a U-shaped, laminated core with the legs thereof terminating in close proximity to said rotor coil and coil means for generating an A.C. magnetic flux in said core.

3. The combination defined in claim 2, including a magnetic flux return path member mounted radially inwardly of said rotor coil, whereby the rotor coil is positioned in the air gap between the poles of the core and the return path member to intensify the flux linking the coil.

4. In combination with a floated, single-axis gyroscope including a housing containing a floatation medium, a float mounted in said housing for angular movement about an axis constituting the output axis of the gyroscope, and a gyro spin motor mounted for high-speed rotation within the float, an output signal pickoff comprising:
    cylindrical fluid seal wall means secured to, and forming a fluid-tight chamber at one end of said housing;
    pickoff rotor means disposed in said chamber and attached to the exterior of said float for conjoint rotational displacement therewith about said output axis, said rotor means including a plurality of coils disposed in circumferentially-spaced relation about said output axis and having respective axes substantially perpendicular to said output axis;
    plural pickoff stator means disposed externally of said chamber and in circumferentially-spaced relation about said seal wall means, said stator means including U-shaped, laminated cores, with the legs thereof terminating in close proximity to said rotor coil, and stator coil means for generating an A.C. magnetic flux in said cores; and
    a magnetic flux return path member in said chamber disposed radially inwardly of said pickoff rotor means and fixed to said seal wall means whereby the rotor coils are positioned in the air gap between the poles of the stator cores and the return path member to intensify the flux linking the rotor coils.

5. In combination with a floated, single-axis gyroscope including a housing containing a flotation medium, a float mounted in said housing for angular movement about an axis constituting the output axis of the gyroscope, and a gyrospin motor mounted for high-speed rotation within the float, an output signal pickoff comprising:
    cylindrical fluid seal wall means secured to, and forming a fluid-tight chamber at one end of, said housing;
    pickoff rotor means disposed in said chamber and attached to the exterior of said float for conjoint rotational displacement therewith about said output axis, said rotor means including a rotor member having a hollow cylindrical portion coaxial with respect to said output axis and having a plurality of coils disposed in circumferentially-spaced relation about said output axis with their respective axes substantially perpendicular to said output axis;
    plural pickoff stator means disposed externally of said chamber and in circumferentially-spaced relation about said seal wall means, said stator means including U-shaped laminated cores with the legs thereof terminating in close proximity to said rotor coil and coil means for generating an A.C. magnetic flux in said cores; and
    a magnetic flux return path member in said chamber having a hollow cylindrical side wall portion disposed coaxially with respect to said output axis and radially inwardly of said side wall portion, whereby the rotor coils are positoned in an air gap between the poles of the cores and the return path member to intensify the flux linking the coils.

References Cited by the Examiner
UNITED STATES PATENTS

| | | | |
|---|---|---|---|
| 2,902,863 | 9/59 | Steele | 74—5.6 X |
| 3,074,283 | 1/63 | Quermann | 74—5.5 X |

BROUGHTON G. DURHAM, *Primary Examiner.*